(12) United States Patent
Sabournin

(10) Patent No.: US 12,337,778 B2
(45) Date of Patent: Jun. 24, 2025

(54) DEVICE FOR DETECTING THE PRESENCE OF AN OCCUPANT INSIDE THE PASSENGER COMPARTMENT OF A VEHICLE

(71) Applicant: AUTOLIV DEVELOPMENT AB, Vargarda (SE)

(72) Inventor: Pierre Sabournin, Ecquevilly (FR)

(73) Assignee: Autoliv Development AB, Vårgårda (SE)

( * ) Notice: Subject to any disclaimer, the term of this patent is extended or adjusted under 35 U.S.C. 154(b) by 771 days.

(21) Appl. No.: 17/057,896

(22) PCT Filed: May 21, 2019

(86) PCT No.: PCT/EP2019/063057
§ 371 (c)(1),
(2) Date: Nov. 23, 2020

(87) PCT Pub. No.: WO2019/224177
PCT Pub. Date: Nov. 28, 2019

(65) Prior Publication Data
US 2021/0206334 A1    Jul. 8, 2021

(30) Foreign Application Priority Data
May 25, 2018   (FR) ...................................... 1854463

(51) Int. Cl.
*B60R 21/015* (2006.01)
*B62D 1/04* (2006.01)
*B62D 1/06* (2006.01)

(52) U.S. Cl.
CPC .. *B60R 21/01532* (2014.10); *B60R 21/01552* (2014.10); *B62D 1/046* (2013.01); *B62D 1/06* (2013.01)

(58) Field of Classification Search
CPC ........ B60R 21/01532; B60R 21/01552; B62D 1/046; B62D 1/06
See application file for complete search history.

(56) References Cited

U.S. PATENT DOCUMENTS

| 4,050,018 A * | 9/1977 | Goodman .......... G01R 27/2605 324/649 |
| 4,370,616 A * | 1/1983 | Williams ............... G01R 29/12 324/458 |

(Continued)

FOREIGN PATENT DOCUMENTS

| EP | 2036780 A1 | 3/2009 |
| EP | 2353946 A1 | 8/2011 |
| FR | 2903638 A1 | 1/2008 |

*Primary Examiner* — Fadey S. Jabr
*Assistant Examiner* — Michael J Herrera
(74) *Attorney, Agent, or Firm* — Matthew D. Thayne; Thayne and Davis LLC

(57) ABSTRACT

The present invention relates to a capacitive device (2) in a motor vehicle for detecting the presence of an occupant inside the vehicle, said device comprising
a first electrode (20) separated from a second electrode (21) by a dielectric material (22) so as to form a capacitive sensor, said capacitive sensor being arranged on a surface of a component of the vehicle,
a voltage generator (23) arranged to generate an AC voltage between said first and second electrodes (20, 21), and
a current measurement circuit (24) arranged to measure the current between the second electrode and an exposed conductive part of the vehicle, the presence of said occupant near said component being a function of the measured current.

11 Claims, 3 Drawing Sheets

(56) References Cited

U.S. PATENT DOCUMENTS

| | | | | |
|---|---|---|---|---|
| 4,878,017 A * | 10/1989 | Williams | ............... | G01R 29/12 |
| | | | | 324/458 |
| 6,516,527 B1 * | 2/2003 | Moriyasu | ................. | G01C 9/20 |
| | | | | 33/366.11 |
| 9,829,405 B2 * | 11/2017 | Kuisma | ................. | G01L 9/0072 |
| 2001/0045733 A1 * | 11/2001 | Stanley | ............... | H03K 17/955 |
| | | | | 180/273 |
| 2006/0164254 A1 * | 7/2006 | Kamizono | ........ | B60R 21/01532 |
| | | | | 297/217.3 |
| 2006/0231320 A1 | 10/2006 | Kamizono et al. | | |
| 2008/0011732 A1 * | 1/2008 | Ito | ......................... | B60N 2/002 |
| | | | | 219/202 |
| 2008/0018143 A1 | 1/2008 | Ito et al. | | |
| 2010/0295563 A1 | 11/2010 | Bieck et al. | | |
| 2012/0132006 A1 * | 5/2012 | Roziere | ................... | G01D 5/24 |
| | | | | 73/724 |
| 2013/0060120 A1 * | 3/2013 | Futatsuyama | ........ | A61B 5/6893 |
| | | | | 600/393 |
| 2015/0048845 A1 * | 2/2015 | Petereit | ............. | G01R 27/2605 |
| | | | | 324/663 |
| 2015/0367751 A1 | 12/2015 | Laurent et al. | | |
| 2020/0198498 A1 * | 6/2020 | Althaus | ................. | B60N 2/002 |

* cited by examiner

DEVICE FOR DETECTING THE PRESENCE OF AN OCCUPANT INSIDE THE PASSENGER COMPARTMENT OF A VEHICLE

The present invention relates in general to a capacitive device for detecting the presence of an occupant inside a motor vehicle. The device can be used in particular to detect the presence of the hands of a driver on the steering wheel of the vehicle or the presence of an occupant on one of the seats of the vehicle.

Such capacitive devices are known in the prior art, like that which is disclosed in document US 2010/0295563, disclosing a device comprising two electrodes separated by a dielectric material, an AC voltage generator and a circuit for measuring the current circulating between the two electrodes. The AC voltage generator is connected between the second electrode and the exposed conductive part of the vehicle. This device is mounted in a seat of the vehicle in order to detect the presence of an occupant on this seat. The detection is achieved by measuring the current circulating between the two electrodes, the intensity of this current being modified when the seat is occupied.

One major drawback of this device is that it creates permanent electromagnetic interferences (or disruptions) since an alternating current circulates continuously between the second electrode and the exposed conductive part of the vehicle.

Document FR 2 903 638 A1 describes a passenger seat comprising an occupant detector for a motor vehicle.

Document US 2008/018143 A1 likewise discloses a passenger seat with an occupant detector as well as a seat heater covered with a waterproof sheet.

One aim of the present invention is to resolve the disadvantages of the prior art mentioned above and in particular to reduce the emission of electromagnetic interferences.

For this, a first object of the invention relates to a capacitive measurement device in a motor vehicle for detecting the presence of an occupant inside the vehicle, said device comprising:
  a first electrode separated from a second electrode by a dielectric material so as to form a capacitive sensor, said capacitive sensor being arranged on a surface of a component of the vehicle,
  a voltage generator arranged to generate an AC voltage between said first and second electrodes, and
  a current measurement circuit arranged to measure the current between the second electrode and an exposed conductive part of the vehicle, the presence of said occupant near said component being a function of the measured current.

With this arrangement, the current measurement circuit only receives current when an occupant approaches the first electrode, which makes it possible to reduce the emission of electromagnetic interferences since no signal passes through the exposed conductive part when the occupant is not near the device. The detection is also improved since this makes it possible to differentiate more easily the presence of an occupant near the first electrode (current present) and the absence of occupant (no current). Typically, the current measurement is a measurement of the intensity of the current.

Moreover, unlike a detection system based on the measurement of a voltage, the present invention makes it possible to detect an interruption in a more reliable manner, since the detection of the current makes it possible to detect in a reliable manner an interruption in the line connecting the second electrode to the exposed conductive part, since the current will be zero.

Conversely, in the same situation, the voltage between the second electrode and the exposed conductive part of the vehicle is maintained regardless of whether or not the line between these two points is interrupted, which reduces the efficiency of a detection system based on a voltage measurement.

Advantageously, the voltage generator can be connected between said first and second electrodes. In other words, the voltage generator comprises two output terminals, and each of the output terminals is electrically connected to one of the first electrode or the second electrode.

In particular, the vehicle component can be a steering wheel or a seat, comprising a metal frame (or a base structure forming a frame), and the first electrode and the second electrode can each be separate from the frame. In other words, according to a specific embodiment, the voltage generator may not be connected to the frame, in order to apply voltage to the first electrode or the second electrode.

According to one embodiment, the voltage generator can be connected between said first and second electrodes via a voltage transformer circuit. This embodiment makes it possible in particular to overcome the imperfections of the voltage generator. A generator made up of operational amplifiers would be more expensive since it requires precise and therefore expensive components in order to reject the common mode.

According to one embodiment, the second electrode can be a virtual ground. This makes it possible to avoid alternating currents in the second electrode. Typically, such a virtual ground can be obtained with an operational amplifier mounted between the second electrode and the exposed conductive part of the vehicle.

According to one embodiment, the potential of the second electrode can be zero.

According to one embodiment, at least one capacitor can be mounted in series between the voltage generator and each of the first and second electrodes.

According to one embodiment, each of the at least one capacitor is a capacitor with a capacitance in the range of values from 0.5 µF to 10 µF, and preferably within the range of values from 1.5 µF to 3.5 µF.

According to one embodiment, the current measurement circuit can comprise
  an operational amplifier, mounted as current-voltage converter connected between the second electrode and the exposed conductive part of the vehicle, delivering an output voltage that is a function of the current circulating between the second electrode and the exposed conductive part of the vehicle, and
  a circuit for processing said output voltage in order to deduce therefrom the possible presence of said occupant near said component.

In this embodiment, the operational amplifier only receives current when the driver is near the steering wheel. The operational amplifier is thus less sensitive to saturation, which allows for greater measurement sensitivity or precision.

A second object of the invention relates to a vehicle steering wheel provided with the capacitive device as defined in the first object of the invention and wherein the second electrode is arranged between said first electrode and an armature of the steering wheel. The armature of the steering wheel can optionally be connected to an exposed conductive part of the vehicle.

A third object of the invention relates to a motor vehicle comprising a vehicle steering wheel as defined in the second object of the invention.

A fourth object of the invention relates to a vehicle seat provided with the capacitive device as defined in the first object of the invention, said seat comprising a frame and wherein the second electrode is arranged between the first electrode and the frame of the seat.

A fifth object of the invention relates to a motor vehicle comprising a seat as defined in the fourth object of the invention.

Other features and advantages of the present invention will be seen more clearly from the following detailed description of an embodiment of the invention provided by way of a non-limiting example and illustrated by the appended drawings, wherein.

The invention is described below in the context of a capacitive device mounted on the steering wheel of a vehicle, said device being intended for detecting the presence of hands (the hands of the driver) on the steering wheel of a vehicle.

Figure 1:
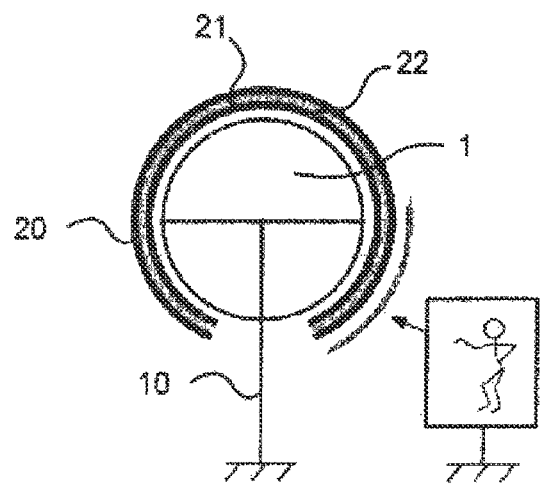
FIG. 1 is a schematic diagram showing a steering wheel provided with two electrodes for detecting the presence of the hands of a driver on the steering wheel.

FIG. 1 schematically shows a steering wheel provided with an armature 10 which can be connected to an exposed conductive part of the vehicle. According to the invention, the steering wheel is provided with an external electrode 20 and an internal electrode 21 separated by a layer of dielectric material 22. The electrode 21 is present between the electrode 20 and the armature 10 of the steering wheel 1. The electrode 21 is present on the steering wheel and is not in direct contact (electrical contact) with the armature of the steering wheel. Said electrodes 20, 21 and the dielectric material form an element or capacitive sensor having a capacitor C10 of predetermined construction. The capacitance C10 is generally comprised between 500 pF and 10 nF, preferably between 1 nF and 5 nF and even more preferably between 1 and 3 nF. This capacitor is visible in FIG. 2.

Figure 2:
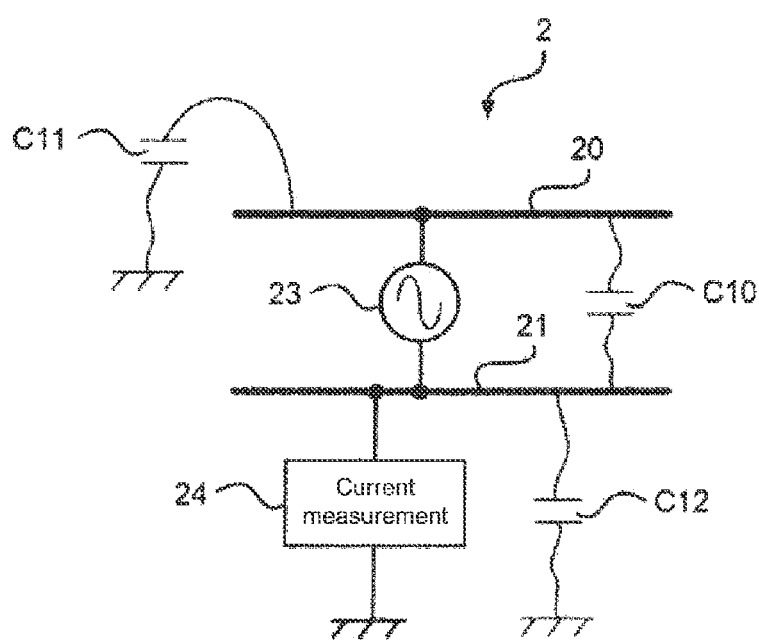
FIG. 2 is a wiring diagram of a capacitive device according to a first embodiment of the invention.

When the driver of the vehicle moves their hands towards the steering wheel, he adds a capacitance which is proportional to the surface of the body part brought closer between the external electrode 20 and the exposed conductive part of the vehicle. Thus, the overall capacitance at the steering wheel of the vehicle is modified. FIG. 2 shows the capacitors present in the steering wheel:

the capacitor with construction C10 present between the electrodes 20 and 21;

the capacitor C11 present between the steering wheel 1 and the exposed conductive part of the vehicle; this capacitor includes the capacitance added by the hands and, where applicable, one or more leakage capacitances linked to the construction of the steering wheel; and the capacitor with construction C12 present between the internal electrode 21 and the exposed conductive part of the vehicle.

FIG. 2 shows a capacitive device 2 according to a first embodiment of the invention. This device comprises, in addition to the electrodes 20 and 21, a voltage generator 23 arranged to generate an AC voltage between the electrodes 20 and 21 and a current measurement circuit 24 arranged to measure the current between the electrode 21 and the exposed conductive part of the vehicle.

The voltage generator 23 is connected between the electrodes 20 and 21 and the current measurement circuit 24 is connected between the electrode 21 and the exposed conductive part of the vehicle.

The reference voltage of the voltage generator 23 is a function of the electrode 21. The voltage generator 23 is preferably configured to have very low impedance relative to the capacitor C10 so that the latter only has a negligible influence on the current measured by the current measurement circuit 24.

Figure 3:
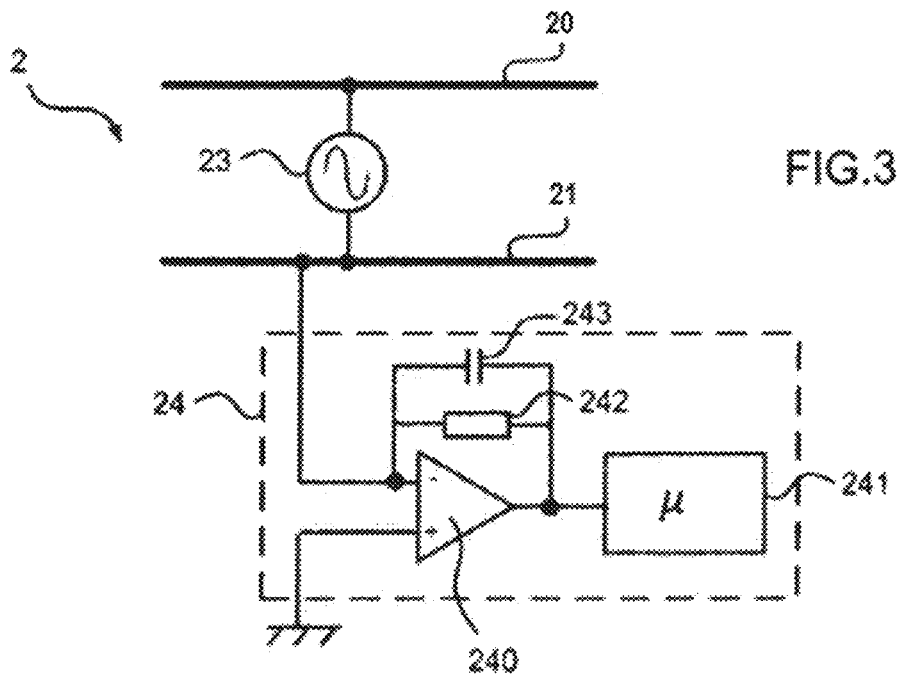
FIG. 3 is a wiring diagram of the device of FIG. 2, wherein the current measurement circuit is shown in detail.

The presence of the hands of the driver near or on the steering wheel is detected by measuring the current between the electrode 21 and the exposed conductive part of the vehicle. As indicated above, this current is measured by the current measurement circuit 24. A wiring diagram of the current measurement circuit 24 is shown in FIG. 3.

The current measurement circuit 24 comprises an operational amplifier 240 connected between the electrode 21 and the exposed conductive part of the vehicle and a processing circuit 241 connected to the output of the operational amplifier. The positive input terminal (+) of the operational amplifier is connected to a polarization voltage which in alternating current is equivalent to an exposed conductive part. In other words, the positive input terminal (+) is connected to a voltage which in alternating current is equivalent to an exposed conductive part, and this arrangement can be considered accordingly to create a virtual ground on the negative input terminal (−).

The negative input terminal (−) of the operational amplifier is connected to the electrode 20. The output terminal of the operational amplifier is linked to the negative input terminal via a resistor 242 mounted in parallel with a capacitor 243 so that the operational amplifier forms a current-voltage converter filtered by the capacitor 243.

The value of the resistor 242 is for example comprised between 1 kΩ and 10 kΩ, preferably between 1 kΩ and 5 kΩ. The value of the resistor is advantageously selected so that the electromagnetic compatibility tests do not saturate the input stage of the amplifier. The capacitance of the capacitor 243 is selected as a function of the desired passband in relation to the frequency of the sine-wave voltage generator. For example, for a frequency of 100 kHz and a 2 kΩ resistor 242, the capacitance of the capacitor 243 is of the order of 220 pF.

The voltage between the input terminals of the operational amplifier 240 is zero or almost zero and its input impedance is very high and considered to be infinite. In this way, the electrode 21 constitutes a virtual ground, which removes all impact of the capacitor C12 (between the electrode 21 and the exposed conductive part of the vehicle) on the measurement since the voltage at the terminals of the capacitor C12 is zero or negligible.

Since the operational amplifier 240 is mounted as a current-voltage converter, the voltage present at its output is a replica of the current circulating between the electrode 21 and the exposed conductive part of the vehicle.

The processing circuit 241 determines from the output voltage of the operational amplifier the possible presence of the hands of the driver near the steering wheel. Indeed, when the driver moves their hands towards the electrode 20

(external electrode), a current appears between the electrode 21 and the virtual ground of the vehicle. This current is converted into voltage by the operational amplifier 240 and detected by the processing circuit 241. The processing circuit 241 is for example an integrated circuit for measuring impedance, such as AD5933 sold by Analog Devices.

This arrangement has one major advantage, namely that a current does not circulate towards the exposed conductive part of the vehicle, through the armature of the steering wheel or the current measurement circuit 24, unless the hands of the driver are in contact with or near the steering wheel. This makes it possible to reduce, or eliminate, the electromagnetic disruptions generated by the device outside of this situation.

This arrangement likewise makes it possible to improve the detection accuracy. Indeed, since the capacitance C11 added by the driver is very weak (of the order of 150 pF for two hands and 15 pF for one finger when there is contact with the steering wheel), the current circulating through the capacitor C11 and the current measurement circuit 24 via the exposed conductive part of the vehicle is very weak. The presence of a current circulating between the electrode 21 and the virtual ground of the vehicle, regardless of whether or not it is weak, thus indicates that the hands of the driver are near the steering wheel of the vehicle.

Furthermore, since the operational amplifier 240 only receives current when the driver is near the steering wheel, it is less sensitive to saturation, and this allows for greater sensitivity or precision of measurement.

In this first embodiment, the voltage generator 23 can be produced by means of two operational amplifiers. However, this requires the use of amplifiers that have relatively expensive precise components in order to reject the common mode.

Figure 4:
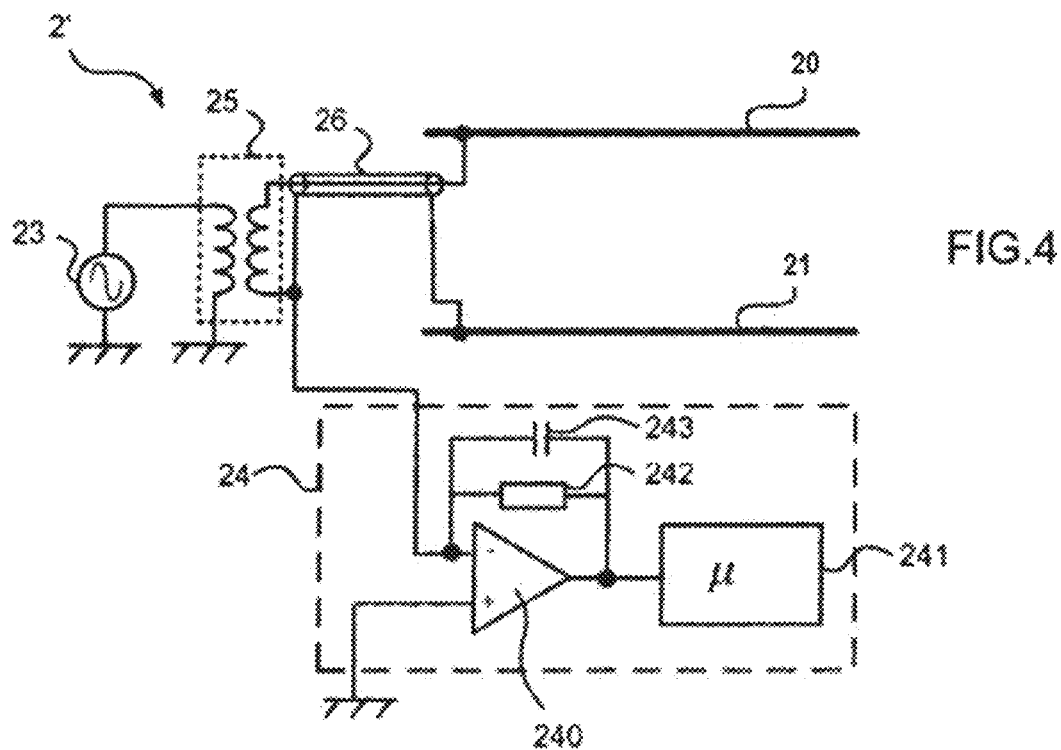
FIG. 4 is a wiring diagram of a capacitive device according to a second embodiment of the invention

Also, according to a second embodiment illustrated by FIG. 4, the voltage generator 23 is connected between the electrodes 20 and 21 via a voltage transformer 25. The voltage generator 23 on the one hand and the electrodes 20 and 21 on the other hand are connected respectively to the primary and secondary of the transformer 25. The transformer is used to create a galvanic isolation between the voltage generator 23 and the electrodes 20, 21, and to prevent the propagation of common mode effects towards the electrodes 20, 21.

The electrodes 20 and 21 are advantageously linked to the secondary of the transformer 25 via a shielded cable 26. The electrodes 20 and 21 are connected, respectively via the core and the shielding of the shielded cable, to the secondary of the transformer. The negative input terminal (−) of the operational amplifier is connected to the secondary of the transformer 25.

The shielded cable 26 makes it possible to carry a constant capacitance. It protects the measurement signal by the virtual ground. The armature of the steering wheel thus does not have an impact on the measurement signal. The shielded cable likewise makes it possible to avoid any signal capture between the voltage generator 23 and the frames 20, 21 that might disrupt the current measurement.

Figure 5:
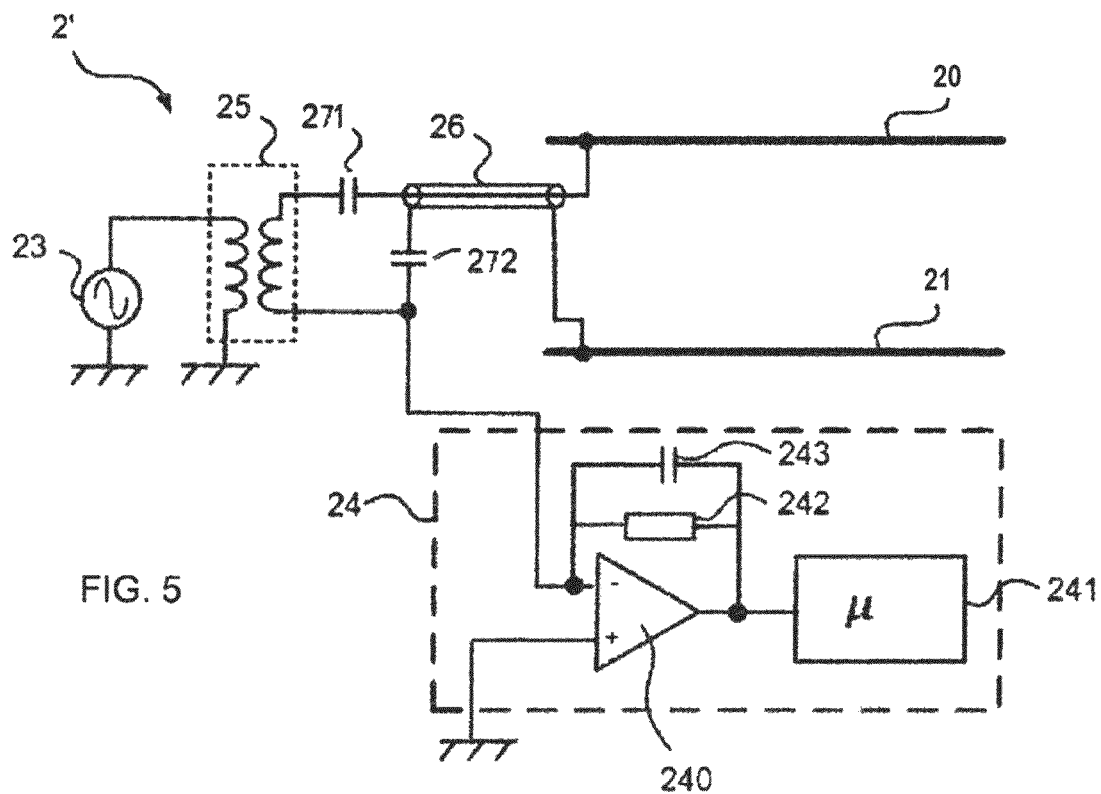
FIG. 5 is a wiring diagram of a capacitive device according to a third embodiment of the invention.

FIG. 5 shows a third embodiment, based on the second embodiment of FIG. 4, modified to improve the robustness of the arrangement. Indeed, one capacitor 271 is added in series with the first electrode and one capacitor 272 is added in series with the second electrode.

The capacitors 271 and 272 are chosen to have low impedance at the frequency of the sine-wave voltage generator (for example 100 kHz) and thus not to allow the passage of direct current. Such an embodiment has the effect of allowing a short-circuit on the battery and/or exposed conductive part of each electrode without damaging the electronic system. The system is thus more robust.

The capacitors 271 and 272 can each be a capacitor with a capacitance in the range of values from 0.5 µF to 10 µF, and preferably within the range of values from 1.5 µF to 3.5 µF. In particular, a value of 2.2 µF can be chosen.

It will be understood that various modifications and/or improvements obvious to those skilled in the art can be made to the different embodiments of the invention described in the present description, without going beyond the scope of the invention as defined by the appended claims. In particular, FIG. 1 shows a vehicle steering wheel, but the electrical device of the invention can also be implanted in a seat or any other component of a vehicle passenger compartment.

The invention can be used for example to detect the presence of an occupant on a motor vehicle seat. Everything that is described above for a steering wheel is thus applicable to a seat, the frame of the seat then corresponding to the armature of the steering wheel. The capacitance and resistance values indicated above for detecting hands on the steering wheel are thus adapted if need be to this novel application.

The invention claimed is:

1. A capacitive device in a motor vehicle for detecting the presence of an occupant inside the vehicle, said device comprising
    a first electrode separated from a second electrode by a dielectric material so as to form a capacitive sensor, said capacitive sensor being arranged on a surface of a component of the vehicle,
    a voltage generator arranged to generate an AC voltage between said first and second electrodes,
    a current measurement circuit arranged to detect a current between the second electrode and an exposed conductive part of the vehicle, the presence of said occupant near said component being a function of the detected current, wherein the current measurement circuit is configured to only receive current when said occupant is near said component,
    a first capacitor electrically connected in series with the first electrode, and
    a second capacitor electrically connected in series with the second electrode.

2. The device according to claim 1, wherein the voltage generator is connected between said first and second electrodes via a voltage transformer circuit.

3. The device according to claim 1, wherein the second electrode is a virtual ground.

4. The device according to claim 1, wherein the potential of the second electrode is zero.

5. The device according to claim 4, comprising at least one capacitor mounted in series between the voltage generator and each of the first and second electrodes.

6. The device according to claim 1, wherein the current measurement circuit comprises
    an operational amplifier, mounted as current-voltage converter connected between the second electrode and the exposed conductive part of the vehicle, delivering an output voltage that is a function of the current circulating between the second electrode and the exposed conductive part of the vehicle, and
    a circuit for processing said output voltage in order to deduce therefrom the possible presence of said occupant near said component.

7. The device according to claim 1, wherein the current measurement circuit is configured to detect the presence of said occupant upon detecting the presence of a current between the second electrode and an exposed conductive part of the vehicle.

8. The device according to claim 1, wherein the capacitive device is configured to, in the absence of an occupant being near the component, maintain a voltage of zero between the second electrode and the exposed conductive part of the vehicle.

9. The device according to claim 1, wherein the first capacitor and the second capacitor are configured to allow a short circuit on the exposed conductive part of the vehicle without damaging the capacitive device.

10. A vehicle steering wheel, comprising:
 a capacitive device, comprising:
  a first electrode separated from a second electrode by a dielectric material so as to form a capacitive sensor, said capacitive sensor being arranged on a surface of a component of the vehicle,
  a first capacitor electrically connected in series with the first electrode,
  a second capacitor electrically connected in series with the second electrode,
  a voltage generator arranged to generate an AC voltage between said first and second electrodes, and
  a current measurement circuit arranged to measure the current between the second electrode and an exposed conductive part of the vehicle, the presence of an occupant inside the vehicle near said component being a function of the measured current; and
 a steering wheel having a steering wheel armature,
  wherein the second electrode is arranged between said first electrode and the steering wheel armature, and
  wherein the current measurement circuit is configured to detect the presence of a driver's hand on or near the steering wheel upon detecting the presence of a non-zero current between the second electrode and the exposed conductive part of the vehicle.

11. The vehicle steering wheel of claim 10, wherein the first capacitor and the second capacitor are configured to allow a short circuit on the exposed conductive part of the vehicle without damaging the capacitive device.

* * * * *